United States Patent
Stevenson et al.

(10) Patent No.: US 6,676,007 B2
(45) Date of Patent: Jan. 13, 2004

(54) METHOD FOR ATTACHING METAL MEMBERS

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 165 days.

(21) Appl. No.: 10/055,575

(22) Filed: Jan. 23, 2002

(65) Prior Publication Data
US 2003/0136810 A1 Jul. 24, 2003

(51) Int. Cl.[7] .............................................. B23K 20/12
(52) U.S. Cl. .................................... 228/112.1; 228/2.1
(58) Field of Search ..................... 228/2.1, 2.3, 112.1, 228/113, 114, 114.5; 156/73.5

(56) References Cited

U.S. PATENT DOCUMENTS

| | | | |
|---|---|---|---|
| 3,594,297 A | * 7/1971 | Singleton | 204/213 |
| 3,762,266 A | * 10/1973 | Thellmann | 411/501 |
| 3,914,144 A | * 10/1975 | Ribich et al. | 156/73.5 |
| 4,130,751 A | * 12/1978 | Gordon | 219/98 |
| 4,599,768 A | * 7/1986 | Doyle et al. | 24/594.11 |
| 4,850,772 A | 7/1989 | Jenkins | |
| 5,469,617 A | 11/1995 | Thomas et al. | |
| 5,712,706 A | * 1/1998 | Castore et al. | 356/394 |
| 5,908,044 A | * 6/1999 | Kearns et al. | 137/15.16 |
| 5,971,252 A | 10/1999 | Rosen et al. | |
| 5,975,406 A | 11/1999 | Mahoney et al. | |
| 6,053,391 A | 4/2000 | Heideman et al. | |
| 6,138,895 A | 10/2000 | Oelgoetz et al. | |
| 6,153,035 A | * 11/2000 | Van Laeken | 156/73.5 |
| 6,206,268 B1 | 3/2001 | Mahoney | |
| 6,213,379 B1 | 4/2001 | Takeshita et al. | |
| 6,227,430 B1 | 5/2001 | Rosen et al. | |
| 6,227,433 B1 | * 5/2001 | Waldron et al. | 228/112.1 |
| 6,230,958 B1 | * 5/2001 | Coletta et al. | 228/114.5 |
| 6,264,088 B1 | 7/2001 | Larsson | |
| 6,327,766 B1 | * 12/2001 | Cardente | 29/402.16 |
| 6,334,568 B1 | * 1/2002 | Seeds | 228/114.5 |
| 6,554,177 B2 | * 4/2003 | Foster et al. | 228/112.1 |
| 6,572,007 B1 | * 6/2003 | Stevenson et al. | 228/112.1 |

FOREIGN PATENT DOCUMENTS

| | | | |
|---|---|---|---|
| EP | 0780581 A1 | * | 6/1997 |
| JP | 02001321967 A | * | 11/2001 |
| JP | 02003062678 A | * | 3/2003 |

OTHER PUBLICATIONS

US 2002/0125297A1 Stol et al. (Sep. 12, 2002).*
US 2003/0135974A1 Stevenson et al. (Jul. 24, 2003).*
US 2003/0066864A1 Delano (Apr. 10, 2003).*
US 2003/0136810A1 Stevenson et al. (Jul. 24, 2003).*
10/054,779 filed Jan. 23, 2002 Copending U.S. application entitled "A Method for Attaching Metal Members", Ser. No. To Be Assigned, Filed Contemporaneously Herewith (Attorney Docket No. GP–301459).
10/055,566 filed Jan. 23, 2002 Copending U.S. application entitled "A Method for Attaching Metal Members", Ser. No. To Be Assigned, Filed Contemporaneously Herewith (Attorney Docket No. GP–301476).

* cited by examiner

*Primary Examiner*—Kiley Stoner
(74) *Attorney, Agent, or Firm*—Kathryn A. Marra

(57) ABSTRACT

A first metal member is contacted with a second metal member. A metal fastener is provided including a top radially enlarged portion, a bottom radially enlarged portion and a shank portion intermediate the thicker portions for forming a circumferential groove about the axis and fastener. The fastener is driven through the first member and into the second member, inducing friction between the fastener, the first member and the second member for at least locally melting portions of the first member and the second member to form a flowable material that flows into the circumferential groove of the fastener and solidifies.

20 Claims, 2 Drawing Sheets

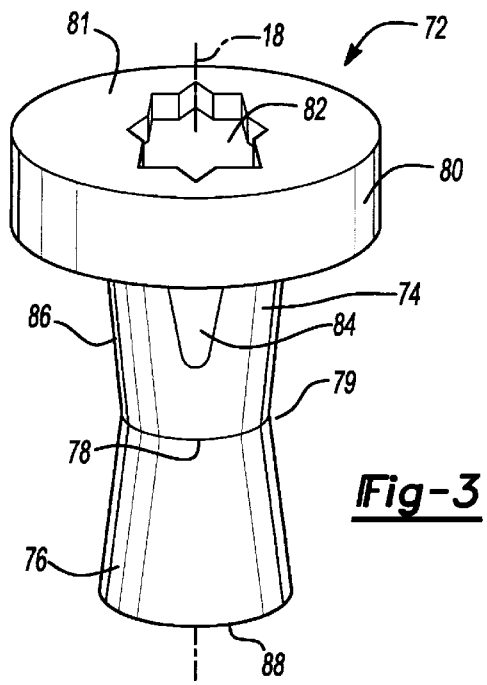
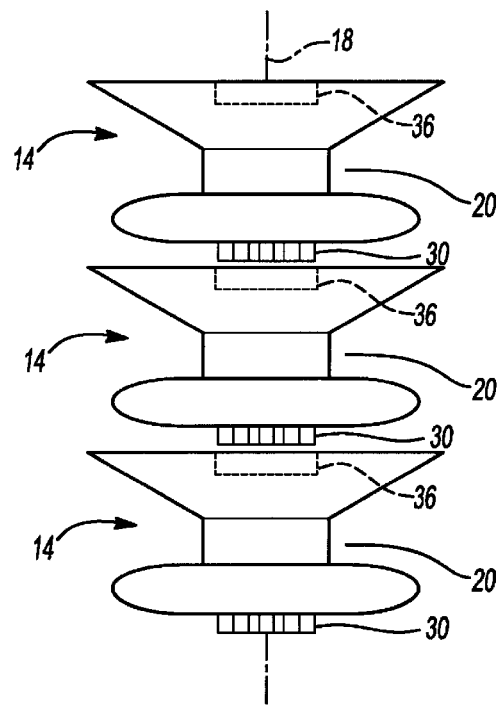
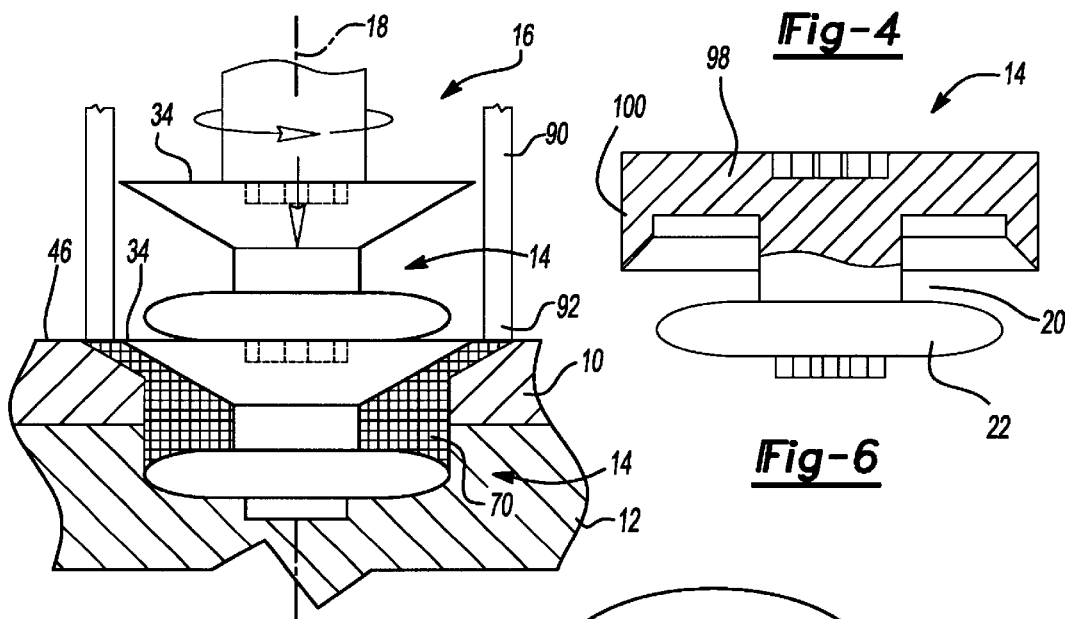
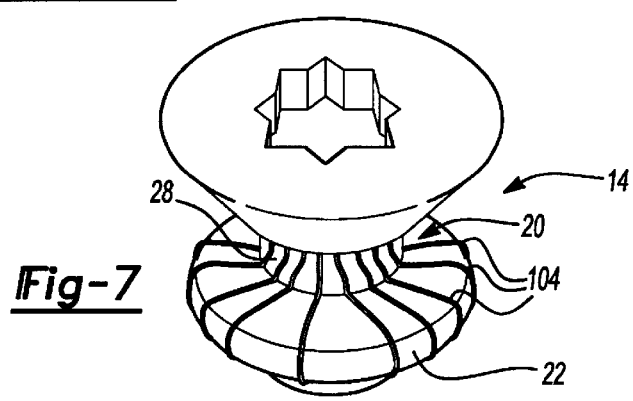

METHOD FOR ATTACHING METAL MEMBERS

TECHNICAL FIELD

The present invention relates to a method and apparatus for attaching metal members for assembling automotive vehicle structures.

BACKGROUND OF THE INVENTION

It is known that the manufacture of automotive vehicles often requires that metal members be attached to each other for forming automotive vehicle structures. Friction stir welding is one potential method of attaching metal members. Conventional friction stir welding typically requires a rotating tool to be translated along an interface between surfaces of metal members for softening or melting portions of the members at the interface. In turn, the softened or melted portions intermix and harden to form metallurgical bonds between the members. During a conventional friction stir welding process, however, substantial amounts of liquidized material may be lost or unused forming weaker bonds. Moreover, a conventional stir welding process may require relatively large amounts of time for forming metallurgical bonds. Thus, there is a need for improved techniques, fasteners or both, alternative to conventional friction stir welding for achieving high integrity attachment of a metal members.

SUMMARY OF THE INVENTION

The present invention meets these needs by providing an improved method for attaching metal members, with particular utility in the formation of components for an automotive vehicle. The method includes the steps of:

(a) providing a first metal member;

(b) contacting the first metal member with a second metal member;

(c) providing a metal fastener that is substantially symmetrical about a central axis, the metal fastener including a top radially enlarged portion, a bottom radially enlarged portion and a shank portion intermediate the thicker portions for forming a circumferential groove about the axis and fastener;

(d) rotating the metal fastener about the axis using a rotary driving apparatus;

(e) driving the metal fastener through the first member and into the second member during rotation of the fastener thereby inducing friction between the fastener, the first member and the second member for at least locally melting portions of the first member and the second member to form a flowable material that flows into the circumferential groove of the fastener and wherein the fastener is driven only partially into the second member; and (f) solidifying the flowable material within the circumferential groove for integrally attaching the flowable material, the fastener, the first member and the second member together wherein the flowable material metallurgically bonds with at least the first member and the second member.

BRIEF DESCRIPTION OF THE DRAWINGS

These and other aspects and advantages of the present invention will become apparent upon reading the following detailed description in combination with the accompanying drawings, in which:

FIG. 3 illustrates an alternative fastener for attaching metal members;

FIG. 4 illustrates an alternative method of using fasteners to attach metal members;

FIG. 5 illustrates another alternative method of using fasteners to attach metal members;

FIG. 6 illustrates another alternative fastener for attaching metal members; and FIG. 7 illustrates another alternative fastener for attaching metal members.

DETAILED DESCRIPTION OF THE PREFERRED EMBODIMENT

Figure 1:
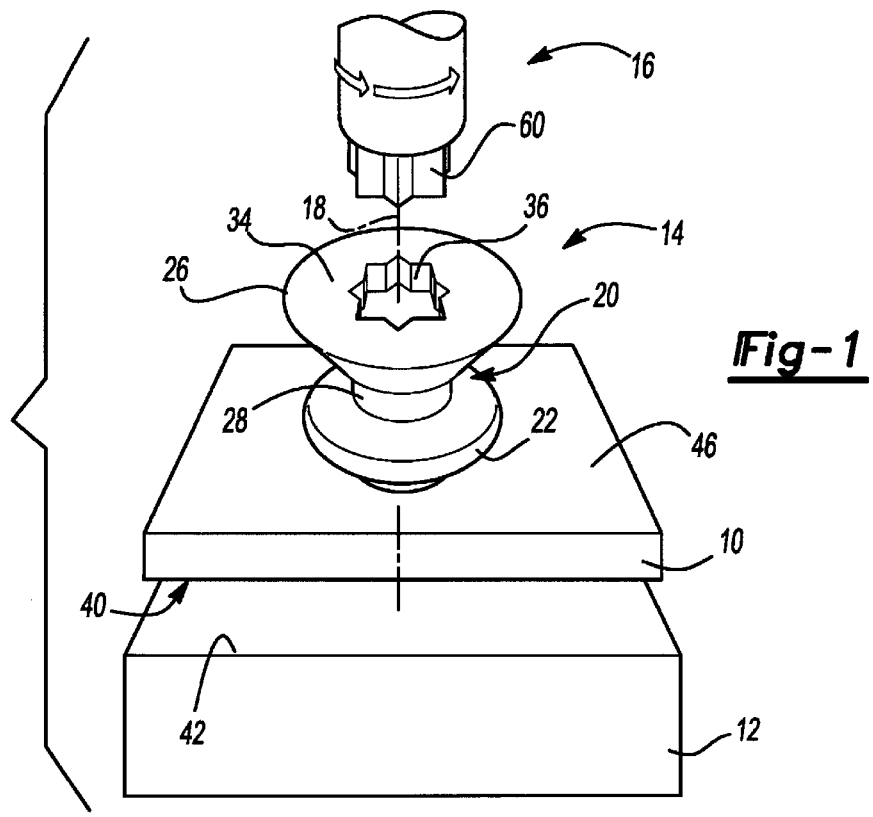
FIG. 1 illustrates an apparatus and metal fastener for attaching metal members.
Figure 2:
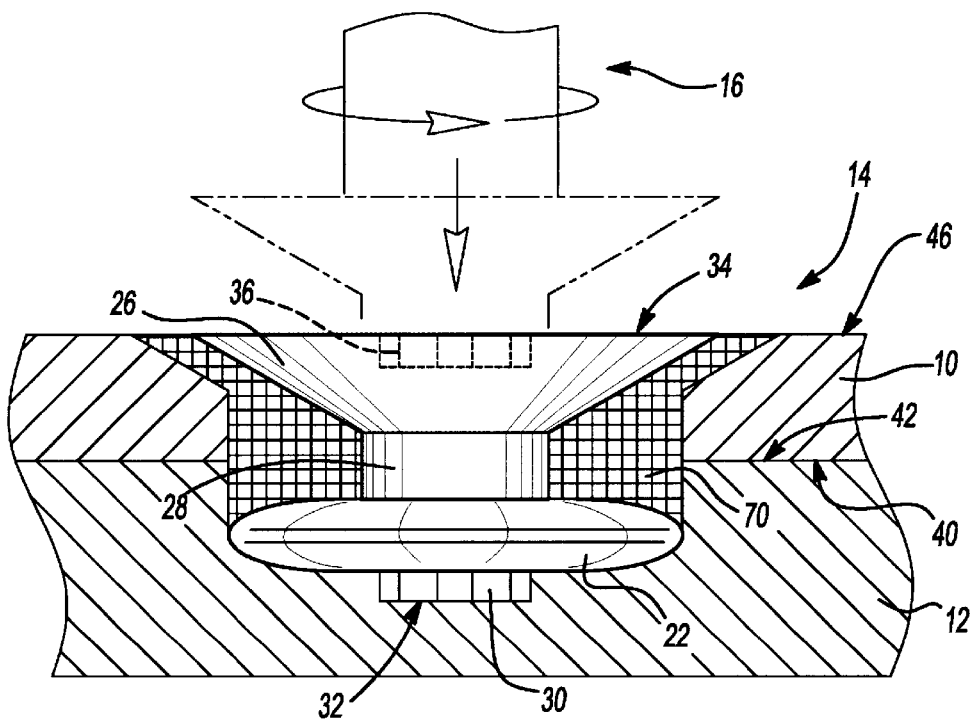
FIG. 2 illustrates a metal sheet attached to a metal substrate with a metal fastener.

Referring to FIGS. 1 and 2, there is illustrated one preferred system for attaching metal members to each other in accordance with the present invention. As shown, a metal sheet 10 is attached to a metal substrate 12 with a fastener 14 that is driven through the sheet 10 and into the substrate 12 by a rotary driving apparatus 16 for driving the fastener 14.

As shown, the fastener 14 is substantially symmetrical about a central axis 18. As can be seen, the fastener 14 varies in radial thickness at different locations along its length. Preferably, spaced shoulders are provided for thereby forming a circumferential groove 20. For example, as seen in FIGS. 1 and 2, the fastener 14 includes a disk-shaped portion 22 toward one end, and a conical portion 26 toward another end. The disk shaped portion 22 and the conical portion are joined by a shank 28, which also defines the circumferential groove 20. The fastener 14 also includes a leading portion 30 adjacent to or as part of the disk-shaped portion 22, with a leading surface 32. The leading portion 30 may be of any suitable shape, (e.g., generally cylindrical or polygonal and may be tapered to a point or non-tapered).

The conical portion 26 has a driving surface 34 with a cavity 36 formed therein. The cavity 36 is preferably polygonal or non-circular in shape and is adapted for receiving a bit of a rotary driving tool. The conical portion 26 preferably tapers from the driving surface 34 to the shank 28.

Preferably, the fastener 14 is formed of a relatively high melting point metal or refractory metal such that the fastener 14 has a substantially higher melting point than the members into which it will be inserted (e.g., by at least 1000 Fahrenheit higher and more preferably by at least 200° Fahrenheit). Moreover, the fastener 14 is preferably formed of a metal of substantially greater hardness than the sheet 10 and substrate 12. Exemplary metals include high carbon steel, titanium (e.g., titanium 6-4) and the like.

The metal sheet 10 is placed on the substrate 12 with a first surface 40 of the sheet 10 contacting a first surface 42 of the substrate 12 to form an interface. Additionally, the metal sheet 10 includes a second surface 46 opposite the first surface 40 wherein the second surface 46 remains exposed when the sheet 10 is placed on the substrate 12. Preferably, the sheet is from about 0.3 millimeters thick to about 8 millimeters thick at the location of attachment to a substrate. Preferably, the substrate is about 4 millimeters thick to about 25 millimeters thick or more at the location of attachment.

The sheet 10 and substrate 12 may be formed of metals such as aluminum, magnesium, steel and the like.

The rotary driving apparatus 16 is preferably an automatic or semiautomatic rotation device, such as a drill, capable of rotating a bit 60 inserted in the apparatus 16. The shape of the bit 60 preferably is substantially complementary to the shape of the cavity 36 for substantial mating engagement.

During rotation, the leading surface 32 of the leading portion 30 of the fastener 14 is contacted with the exposed surface 46 of the sheet 10 and the apparatus 16 provides a force driving the fastener 14 into and through the sheet 10 and then into the substrate 12. As the fastener 14 is driven through the sheet 10 and into the substrate 12, the rotation of the fastener 14 causes the fastener 14 to frictionally contact the sheet 10 and the substrate 12 thereby at least locally melting portions of the sheet 10 and substrate 12. The liquidized portions intermix to form a flowable material 70 that flows into the circumferential groove 20 of the fastener 14, for helping to anchor the fastener in place upon solidification.

Preferably, the fastener 14 is driven into the substrate 12 until the outer surface 34 of the fastener 14 is substantially flush with the exposed second surface 46 of the sheet 10. Thereafter, the flowable material 70 solidifies within the circumferential groove 20 of the fastener 14 for attaching the sheet 10, the substrate 12, the flowable material 70 and the fastener 14 together.

Advantageously, the flowable material 70 solidifies to form a metallurgical bond with the sheet 10 and the substrate 12 thereby attaching the sheet 10 to the substrate 12. Moreover, the flowable material 70 solidifies to interference fit the disk portion 22 of the fastener 14 in place for additional attaching reinforcement. Also advantageous, the fastener 14 may be driven through the sheet 10 and into the substrate 12 relatively rapidly for attaching the sheet 10 and substrate 12.

As can be seen, the fastener 14 is only driven into the substrate 12 without necessarily being driven through the substrate 12. It will be appreciated that the present invention provides a method that is particularly useful for attaching a metal sheet to a thicker substrate where it is either undesirable or unfeasible to form a through-hole in the substrate. Moreover, the present invention provides a method of attaching a sheet to a substrate without having to pre-form holes or cavities in the sheet and substrate.

Referring to FIG. 3, there is illustrated an alternative fastener 72 for attaching a sheet to a substrate. The fastener 72 includes a conical first portion 74, a conical second portion 76 and an interface 78. The conical first portion 74 preferably has a cylindrical cap 80 disposed thereon that includes an exposed surface 81 with a cavity 82 formed therein. The cavity 82 is preferably polygonal or noncircular in shape and is adapted for receiving a bit of a rotary driving tool. The first portion 74 also includes laterally opposing indentations 84 formed on an outer conical surface 86. The second portion 76 has a leading surface 88.

It will be recognized that the fastener 72 of FIG. 3 may be secured to metal members in a substantially identical manner to that described with respect to the fastener 14 of FIGS. 1 and 2.

The present invention also pertains to techniques for delivering a plurality of fasteners for rapid consecutive installation. Thus, referring now to FIGS. 4 and 5, in another embodiment, a plurality of fasteners (illustrated herein with reference to fastener 14, but applicable as well to the embodiment of FIG. 3), as described herein, may be temporarily stacked on each other. Each of the leading portions 30 of the fasteners has a polygonal or noncircular shape that substantially corresponds to and is matingly fit within the shape of the cavity 36. Thus, an apparatus such as the rotary driving apparatus 16 of FIG. 1 can rotate the entire plurality of fasteners 14 about their central axes 18 by fitting the bit 60 in the cavity 36 of the outermost one of the fasteners 14 and rotating the one fastener 14 which, in turn, causes the plurality of fasteners to rotate simultaneously. As the plurality of fasteners 14 rotates, each of the fasteners 14 can be consecutively driven through a sheet 10 and into a substrate 12. Upon securing in place, adjoining fasteners can be separated, leaving the secured one in place and allowing the stack to be advanced to a next attachment site.

The plurality of fasteners 14 may be temporarily secured to one another by a suitable mechanical attachment (e.g., friction fit), they may be attached with an adhesive or other material, or a combination thereof. For example, a metal (not shown) having a lower melting point than the fasteners 14 may be used to solder or braze each of the fasteners 14 to adjoining stacked fasteners 14. As a first fastener 14 of the plurality is driven through a sheet and into a substrate, the first fastener 14 is heated, which, in turn heats the soldered or brazed metal that attaches the first fastener 14 to an adjoining second fastener 14. The soldered or brazed metal is heated to a temperature sufficient to loosen or at least partially liquidize the metal allowing the second fastener 14 to be removed from the first fastener 14.

In another embodiment, seen in FIG. 5, the plurality of fasteners 14 is temporarily secured within a cartridge 90 that allows one fastener at a time to be consecutively driven through the sheet 10 and into the substrate 12. Preferably, an end portion 92 of the cartridge 90 is configured as a sleeve to at least partially surround the fasteners 14, and maintain their generally common axial disposition relative to each other. The end portion 92 preferably is dimensioned so that as the fastener is advanced and molten metal is generated, it is confined to the interior of the end portion, and does not spread onto the surface 46 of the sheet 10.

Referring to FIG. 6, there is illustrated the fastener 14 of FIGS. 1, 2 and 4–5 with a reconfigured generally cylindrical top portion 98 having an annular flange 100 at the outer periphery of the top portion 98. Advantageously, the flange 100 assists to confine molten material to flow within the groove 20 of the fastener 14 as the fastener 14 is driven through a sheet and into a substrate.

Referring to FIG. 7, there is illustrated the fastener 14 of FIGS. 1, 2 and 4–5 reconfigured to include impellers 104 both on the cylindrical portion 28 and on the disk portion 22. Advantageously, the impellers 104 can increase friction between the fastener 14, the substrate 12, and the sheet 10 and can resist rotation of the fastener 14 about its axis once the fastener 14 is secured in the sheet 10 and substrate 12. Moreover, the impellers 104 may be disposed on those portions 22, 28 of the fastener 14 at angles that allow the impellers 104 to urge flowable materials 70 toward the groove 20. As an alternative to impellers 104, fasteners may also be formed with other structural features for increasing friction and resisting rotation between the fastener, sheet, and substrate. For example, the indentations 84 of the fastener 72 in FIG. 3 can help resist rotation upon flow therein and solidification of the flowable material 70 and the indentations 84 form edges that can increase surface are available for friction.

As can be appreciated, the present invention finds utility in a number of different applications. For example, the metal members (though illustrated as a sheet joined to a substrate) could be any suitable combination of metal parts. Thus, sheet metal, flanges, brackets, trim or the like may be joined to another metal article (e.g., vehicle frame member, vehicle rail member, cast articles, forged articles, or the like). Further, although the present invention has been discussed in terms of metal fasteners, metal sheets and metal substrates, it is contemplated that the fasteners, sheets and substrates may be formed of other materials such as plastic (e.g., thermoplastic).

It should be understood that the invention is not limited to the exact embodiment or construction which has been illustrated and described but that various changes may be made without departing from the spirit and the scope of the invention.

What is claimed is:

1. A method of attaching metal members for forming an automotive vehicle structure, comprising the steps of:
    (a) providing a first metal member;
    (b) contacting the first metal member with a second metal member;
    (c) providing a metal fastener that is substantially symmetrical about a central axis, the metal fastener including a top radially enlarged portion, a bottom radially enlarged portion and a shank portion intermediate the thicker portions for forming a circumferential groove about the axis and fastener;
    (d) rotating the metal fastener about the axis using a rotary driving apparatus; and
    (e) driving the metal fastener through the first member and into the second member during rotation of the fastener thereby inducing friction between the fastener, the first member and the second member for at least locally melting portions of the first member and the second member to form a flowable material that flows into the circumferential groove of the fastener and wherein the fastener is driven only partially into the second member; and
    (f) solidifying the flowable material within the circumferential groove for integrally attaching the flowable material, the fastener, the first member and the second member together wherein the flowable material metallurgically bonds with at least the first member and the second member.

2. A method as in claim 1 wherein the fastener further includes a non-tapered leading portion with a leading surface for initially contacting an exposed surface of the first member.

3. A method as in claim 1 wherein the fastener is formed of a material with a higher melting point than the first member and the second member.

4. A method as in claim 1 wherein the fastener includes impellers for urging the flowable material into the groove.

5. A method as in claim 1 wherein the fastener includes indentations for increasing friction between the fastener and the first member.

6. A method as in claim 1 wherein the top portion of the fastener includes and annular flange for assisting flow of flowable material into the groove.

7. A method as in claim 1 wherein the top portion is generally conical in shape.

8. A method as in claim 1 wherein the bottom portion is generally conical in shape.

9. A method as in claim 1 wherein the first member is an aluminum-based sheet metal and the second member is an aluminum metal casting.

10. A method as in claim 1 wherein the fastener is formed of a refractory metal chosen from the group consisting of high carbon steel and titanium.

11. A method as in claim 1 wherein the providing step (c) includes providing a plurality of fasteners stacked atop each other, and being adapted for simultaneously rotation.

12. A method of attaching a metal sheet to a metal substrate for forming an automotive vehicle structure, comprising the steps of:
    (a) placing the metal sheet on the metal substrate such that a first surface of the sheet interfaces with a surface of the metal substrate, wherein the metal sheet and the metal substrate are adapted for incorporation into an automotive vehicle;
    (b) providing a metal fastener formed of a material of a substantially higher melting point than the sheet and substrate, wherein the fastener is substantially symmetrical about a central axis and includes a top radially thicker portion, a bottom radially thicker portion and a thinner portion intermediate the thicker portions for forming a groove about the axis and fastener, the top portion having a non-circular cavity formed therein;
    (c) rotating the metal fastener about the axis using a rotating apparatus having a member that can be temporarily matingly fit within the non-circular cavity of the conical portion of the fastener;
    (d) driving the metal fastener through the metal sheet and into the metal substrate during rotation of the fastener thereby inducing friction between the fastener, the sheet and the substrate for at least locally melting portions of the sheet and substrate to form a flowable material that flows into the groove of the fastener and wherein the fastener is driven through the sheet and is only partially driven through the substrate, and
    (e) allowing the flowable material to solidify within the annular groove for integrally attaching the flowable material, the fastener, the sheet and the substrate together wherein the flowable material metallurgically bonds with at least the sheet and substrate.

13. A method as in claim 12 wherein the fastener further includes a leading surface for initially contacting an exposed surface of the sheet.

14. A method as in claim 12 wherein the fastener includes impellers for urging the flowable material into the groove.

15. A method as in claim 12 wherein the fastener includes indentations for increasing friction between the fastener and the sheet.

16. A method as in claim 12 wherein the top portion of the fastener includes an annular flange for assisting flow of flowable material into the groove.

17. A method as in claim 12 wherein the top portion is generally conical in shape.

18. A method as in claim 12 wherein the sheet is aluminum sheet metal and substrate is an aluminum metal casting.

19. A method as in claim 12 wherein the fastener is formed of a refractory metal chosen from the group consisting of high carbon steel and titanium.

20. A method as in claim 1 wherein the providing step (b) includes providing a plurality of fasteners stacked atop each other, and being adapted for simultaneously rotation.

* * * * *